(12) United States Patent
Wu

(10) Patent No.: US 7,006,254 B2
(45) Date of Patent: Feb. 28, 2006

(54) METHOD AND SYSTEM FOR DATA HIDING AND AUTHENTICATION VIA HALFTONING AND COORDINATE PROJECTION

(75) Inventor: Chai Wah Wu, Poughquag, NY (US)

(73) Assignee: International Business Machines Corporation, Armonk, NY (US)

(*) Notice: Subject to any disclaimer, the term of this patent is extended or adjusted under 35 U.S.C. 154(b) by 1091 days.

(21) Appl. No.: 09/847,310

(22) Filed: May 3, 2001

(65) Prior Publication Data

US 2002/0171853 A1 Nov. 21, 2002

(51) Int. Cl.
*H04N 1/405* (2006.01)
*H04N 1/52* (2006.01)
*G06T 5/00* (2006.01)
*G06K 9/00* (2006.01)
*G06K 15/00* (2006.01)

(52) U.S. Cl. .................. 358/3.03; 358/3.05; 358/3.26; 358/3.28; 382/100; 382/275

(58) Field of Classification Search ...... 358/3.03–3.06, 358/3.26, 3.28, 1.9, 534–536; 382/100, 252, 382/254, 275; 235/487, 494; 340/5.86
See application file for complete search history.

(56) References Cited

U.S. PATENT DOCUMENTS

| | | | | |
|---|---|---|---|---|
| 5,315,098 A | * | 5/1994 | Tow | 235/494 |
| 6,081,345 A | * | 6/2000 | Curry | 358/3.28 |
| 6,690,811 B1 | * | 2/2004 | Au et al. | 382/100 |
| 6,763,121 B1 | * | 7/2004 | Shaked et al. | 382/100 |
| 6,870,643 B1 | * | 3/2005 | Thompson et al. | 358/3.05 |
| 6,909,524 B1 | * | 6/2005 | Miyake | 358/3.03 |
| 2002/0085238 A1 | * | 7/2002 | Umeda | 358/3.28 |
| 2004/0013284 A1 | * | 1/2004 | Yu | 382/100 |
| 2005/0157906 A1 | * | 7/2005 | Stanich et al. | 382/100 |

OTHER PUBLICATIONS

J. Fridrich and M. Goljan, "Images With Self-Correcting Capabilities" ICIP '99, Kobe, Japan.
R. Adler, B. Kitchens, M. Martens, A. Nogueira, C. Tresser and Chai Wah Wu, "Error Bounds For Error Diffusion And Other Mathematical Problems Arising In Digital Halftoning", IS&T/SPIE Conference on Color Imaging, San Jose, CA, Jan. 2000, pp 437-443.
Risto Nasanen, "Visibilty Of Halftone Dot Textures" IEEE Transactions on Systems, Man, and Cybernetics, vol. SMC-14, No. 6, Nov./Dec. 1984.
Bernd W. Kolpatzik, Charles A. Bouman, "Optimized Error Diffusion For Image Display", Journal of Electronic Imaging, Jul. 1992, vol. 1(3), pp 277-292.
J. Sullivan, L. Ray, and R. Miller, "Design Of Minimum Visual Modulation Halftone Patterns" IEEE Transactions on Systems, Man, and Cybernetics, vol. 21, No. 1, Jan./Feb. 1991, pp 33-38.
Keith T. Knox, "Reversible Digital Images", IS&T/SPIE Conference on Security and Watermarking of Multimedia Contents, San Jose, CA, 1999, pp 397-401.

* cited by examiner

*Primary Examiner*—Scott A. Rogers
(74) *Attorney, Agent, or Firm*—Stephen C. Kaufman, Esq.; McGinn IP Law Group, PLLC

(57) ABSTRACT

A method (and system) of embedding data into an image, includes producing an extended image using a halftoning algorithm on a collection of images, and projecting the extended image onto its first coordinates.

40 Claims, 18 Drawing Sheets

```
For each i              /* rows */
    for each j          /* columns */
        for each u      /* u = 0, 1, ..., k */
            MM_u(i,j) = M_u(i,j) + ∑_{x,y} w_u(x,y)e_u(i-x,j-y)
        endfor (u)
        ExOut (i,j) = argmin_{c∈C} (∑_u v_u |MM_u(k,l) - c_u|^p)^{1/p}
        /* c_u is the (u+1)-th coordinate of c */
        (e_0(i,j), ... e_k(i,j)) = (MM_0(i,j), MM_1(i,j), ...
                                        MM_k(i,j)) - ExOut(i,j)
    endfor (j)
endfor (i)
Set embedded source image M_0' as the first
coordinates of ExOut.
```

FIG.1A

```
    For each iteration                    /* iteration */
        for each i                        /* rows */
            for each j                    /* column */
                for each member d of C    /* search through
5                                            all possible members
                                             of C */
                    set ExOut(i,j) = d
                    compute
```

$$v(d) = |\, L(ExOut_0 - M_0)\,|^2 + |\, L(PExOut_1 - M_0)\,|^2$$

```
10              endfor (d)
                set ExOut(i,j) = argmin v(d)
                                    d
            endfor (j)
        endfor (i)
    endfor (iteration) or until ExOut has not changed
15  between two consecutive iterations.
    Set embedded source image M_0' as the first
    coordintes of ExOut.
```

FIG.5A

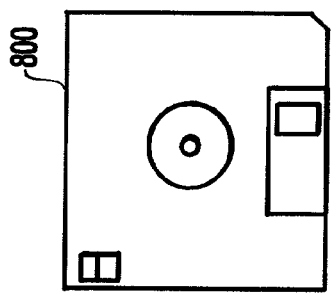
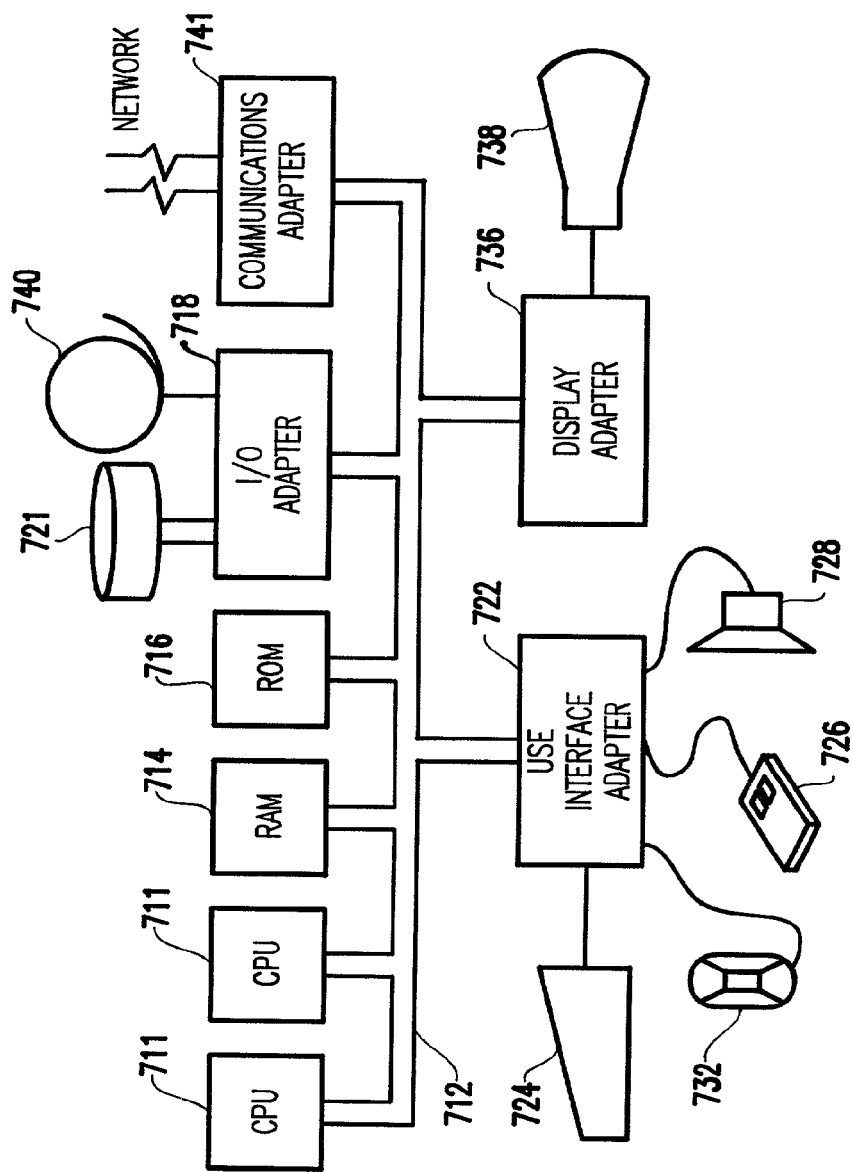
FIG.8
FIG.7

METHOD AND SYSTEM FOR DATA HIDING AND AUTHENTICATION VIA HALFTONING AND COORDINATE PROJECTION

CROSS-REFERENCE TO RELATED APPLICATION

The present application is related to U.S. patent application Ser. No. 09/774,067, filed on Jan. 31, 2001, to Wu et al., entitled "METHOD AND SYSTEM FOR ERROR DIFFUSION WITH A PLURALITY OF ERROR MEASURES", assigned to the present assignee, and incorporated herein by reference.

BACKGROUND OF THE INVENTION

1. Field of the Invention

The present invention generally relates to data hiding and authentication techniques and, more particularly, to a method and apparatus for embedding and extracting auxiliary images imperceptibly into a source image by modified halftoning algorithms.

2. Description of the Related Art

Recently, there has been much interest in data hiding, where information is imperceptibly embedded into multimedia content such as images. The embedded data can be ownership identification, tracking information, recipient information, time stamps, authentication data, and other information useful for various applications such as copyright protection, data integrity verification, verification of origin of data, recipient tracking, etc.

However, prior to the present invention, there have been few efficient methods in which entire images can be embedded into a source image. Indeed, many previous data hiding schemes can only embed a small amount of information into a source image.

Further, there have been few methods in which the embedded image can be used to identify, localize and reverse tampering to images. Previous methods to reverse tampering can only recover a heavily degraded version of the original image.

In one conventional approach, as described, for example, in K. Knox, "Reversible Digital Images", IS&T/SPIE Conference on Security and Watermarking of Multimedia Contents, 1999, pp. 397–401, a system was proposed to embed an image into another image.

However, in this conventional approach, two separate error diffusion algorithms are applied independently to the two images, and therefore the choice of the output colors is not as ideal as the present invention described below.

Secondly, the extraction algorithm in Knox's approach is based on reversing the bits of the pixels. This corresponds to a set C in the present invention of the form (a,r(a)) where r(a) is a with the bits reversed. This function r is very discontinuous yet there is a portion of $[0,255]^2$ which the convex hull of C does not cover. Thus, in the conventional approach, the set C cannot be chosen to be any set of the form (a,f(a)) and the function f cannot be chosen depending on the application. That is, in the conventional approach, f cannot be selected to be smooth for more robustness, nor can f be chosen so that the convex hull of C covers a large portion of $[0,255]^2$. Indeed, in the conventional approach, the function r is one-to-one, while in the present invention, the function f does not have to be one-to-one.

SUMMARY OF THE INVENTION

In view of the foregoing and other problems, drawbacks, and disadvantages of the conventional methods and structures, an object of the present invention is to provide an efficient method (and structure) in which entire images can be embedded into a source image.

Another object is to provide a method (and structure) in which the embedded image can be used to identify, localize and reverse tampering to images.

Yet another object is to provide a method in which separate error diffusion algorithms can be applied jointly to two images, such that a choice of the output colors is ideal for approximating two images at the same time with halftone images.

Still another object is to provide a method and structure in which a set C can be chosen to be any set of the form (a,f(a)) and the function f can be chosen depending on the application and such that f can be selected to be smooth for more robustness, or f can be chosen so that the convex hull of C covers a large portion of the extended color space $[0,255]^2$.

In a first aspect of the present invention, a method (and system) of embedding data into an image, includes producing an extended image using a halftoning algorithm on a collection of images, and projecting the extended image onto its first coordinates.

With the invention, a data hiding technique is performed via halftoning and coordinate projection. Further, the invention can also be used in a multimedia authentication scheme.

The data hiding scheme of the invention embeds auxiliary data into an image imperceptibly. As halftoning algorithms throw away or distort data while preserving image appearance, the invention embeds data into an image, but uses halftoning to ensure that the result still looks similar to the original image.

Preferably, the embedding is performed by defining an extended image space which is a Cartesian product of several image spaces. Similarly, the extended color space is defined as a Cartesian product of several color spaces. A mapping is defined from the color space to the extended color space such that the composition of this mapping followed by a first coordinate projection is the identity. The modified source image in which the auxiliary images are embedded is obtained by a first coordinate projection, while other coordinate projections extract the embedded auxiliary images.

Thus, for example, consider images represented as matrices of vectors. For example, an image M is represented by a n by m matrix M(i,j) of d-dimensional vectors. The (i,j)-th entry of M, denoted as M(i,j), is called the (i,j)-th pixel of M. Each pixel M(i,j) is a d-dimensional vector, where d denotes the dimension of the color space (i.e., d=1 for a grayscale image, d=3 for an image in RGB or LAB color space and d=4 for an image in CMYK space).

In the preferred embodiment, each d-dimensional vector is in the set $\{0,1,\ldots 255\}^d$ (i.e., d-bytes of data, although the invention also works for other sets of the form $S^d$). In some implementations, M also can be represented as d matrices of scalars. For instance, a color image in RGB space can be considered as three (3) grayscale images by separating the image into its separate color planes.

Hence, given a source image $M_0$ and auxiliary images $M_1, \ldots, M_k$, the goal is to embed $M_1, \ldots, M_k$ into $M_0$ imperceptibly. This is accomplished as follows:

First, a set C of extended colors are chosen. For purposes of the present application, an "extended color" represents a concatenation (or equivalently, the Cartesian product) of k+1 colors. Thus, if each color is a d-dimensional vector, an extended color is a (k+1)d dimensional vector or a (k+1)-tuple of d-dimensional vectors. Thus, each member of this set C is a (k+1)-tuple of d-dimensional vectors. For a member D of the set C, each of the k+1 d-dimensional vectors of D is termed a coordinate of D. For example, for $D=(c_1, c_2, \ldots, c_{k+1})$ where each $c_1$, is a d-dimensional vector, the first, second, ..., (k+1)-th coordinates of D are $c_1, c_2, \ldots, c_{k+1}$, respectively.

The set C is chosen such that for each j in the set $\{0,1,\ldots,255\}^d$, there exists at most one member of C such that the first coordinate is j. In other words, the size of C is less than the size of $\{0,1,\ldots,255\}^d$ $(=256^d)$ and a projection of C into its first coordinate is a one-to-one mapping.

In a preferred embodiment, additionally it is required that C is of the same size as $\{0,1,\ldots,255\}^d$. This means that for each j in the set $\{0,1,\ldots,255\}^d$, there exists exactly one member of C such that the first coordinate is j and the projection of C into its first coordinate is a bijection from C into $\{0,1,\ldots 255\}^d$. This is called bijection $P_c$.

The images $M_1, \ldots, M_k$ are embedded into $M_0$ as follows.

An extended output image ExOut is chosen as a matrix of elements of C. The embedded source image $M_0'$ is generated by taking the first coordinate of the entries of ExOut.

To extract the embedded images from $M_0'$, the following algorithm (process) is used. That is, for each of the pixels $M'(i,j)$ of $M_0'$, find the element $c(i,j)$ in C such that $M'(i,j)$ is the first coordinate. If the bijection $P_C$ is defined, then $c(i,j)=P_C^{-1}(M_0'(i,j))$. Then, generate the reconstructed embedded images $M_1', M_2', \ldots M_k'$ by setting $M_u'(i,j)$ equal to the (u+1)-th coordinate of $c(i,j)$, $u=1,\ldots,k$.

It is clear that $M_0', M_1', M_2', \ldots M_k'$ form the coordinates of ExOut. To ensure that the images $M_0', M_1', M_2', \ldots M_k'$ resemble $M_0, M_1, M_2, \ldots M_k$, the problem is recast as a halftoning problem and a halftoning algorithm is used to pick the entries of ExOut.

Thus, with the invention, an efficient method (and structure) is provided in which entire images can be embedded into a source image. The embedded image can be used to identify, localize and reverse tampering to images, and the embedding is performed via halftoning and coordinate projection. Thus, the invention embeds data into an image, and uses halftoning to ensure that the result still looks similar to the original image. Besides data hiding, the invention is advantageously used in a multimedia authentication scheme.

Further, with the invention, separate error diffusion algorithms can be applied jointly to two or more images, such that a choice of output colors is optimized.

Further, with the invention, regarding a set C, such a set can be chosen to be any set of the form (a,f(a)) and the function f can be chosen depending on the application.

Thus, the invention as compared to the conventional data hiding approaches, has better performance, has less artifacts, is more robust, and has greater fidelity in embedding an image into a source image. Further, as a corollary to the above, the invention provides greatly improved authentication. For instance, in the inventive authentication scheme, any portion of the image can be used to reconstruct the entire image. The larger the portion used, the higher the fidelity of the reconstruction. Large areas of the image can be tampered with and the tampering can still be localized and effectively repaired.

BRIEF DESCRIPTION OF THE DRAWINGS

The foregoing and other purposes, aspects and advantages will be better understood from the following detailed description of a preferred embodiment of the invention with reference to the drawings, in which:

FIG. 1A is a preferred embodiment of the invention in pseudo-code form;

FIG. 5A shows another preferred embodiment in pseudo-code form;

FIG. 7 illustrates an exemplary information handling/computer system 700 for use with the present invention; and FIG. 8 illustrates a storage medium 800 for storing steps of the program for the method according to the present invention.

DETAILED DESCRIPTION OF PREFERRED EMBODIMENTS OF THE INVENTION

Figure 1B:
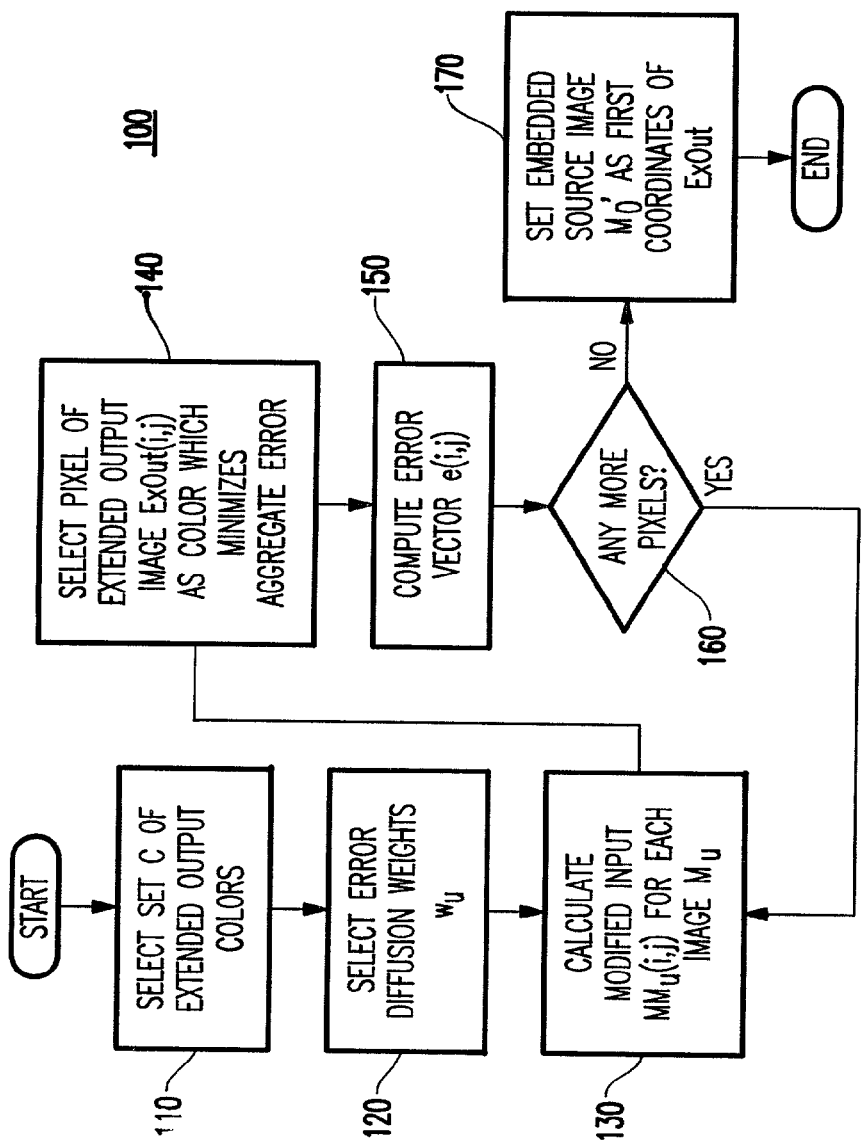
FIG. 1B is a flowchart of a method 100 of the present invention corresponding to the pseudo-code of FIG. 1A.

Referring now to the drawings, and more particularly to FIGS. 1A–8, there are shown preferred embodiments of the method and structures according to the present invention.

First Preferred Embodiment

Referring to the pseudo-code of FIG. 1A and the flowchart of FIG. 1B, generally, given a source image $M_0$ and additional images $M_1, M_2, \ldots$, the present invention is directed to a method to embed $M_1, M_2, \ldots$, imperceptibly into source image $M_0$ resulting in a modified image $M_0'$. The invention also provides a method to extract $M_1, M_2, \ldots$, from the modified image $M_0'$.

With the invention, such embedded images can be used to authenticate the source image and to identify, localize and reverse modifications (e.g., tampering) to the source image.

Turning now to the details of the invention, given a source image $M_0$ and k auxiliary images $M_1, M_2, \ldots, M_k$, an object of the present invention is to create a modified image $M_0'$ which looks like the source image $M_0$ such that images $M'_1, \ldots, M'_k$ can be extracted from $M_0'$ and $M'_1, \ldots, M'_k$ look like $M_1, \ldots, M_k$ respectively.

Images $M_1, M_2, \ldots, M_k$ are embedded into the modified image $M_0'$. $M_u(i,j)$ will be denoted as the (i,j)-th pixel of image $M_u$. Each pixel of $M_u$ is a scalar or a vector, depending on whether the image is a grayscale image or a color image. Furthermore, the pixels of each image $M_u$ can be represented in different color spaces (e.g., $M_1$ can be in RGB space, $M_2$ can be in LAB space, etc.).

In a preferred embodiment, error diffusion is used as the halftoning method. Thus, in the pseudo-code of FIG. 1A, given each i and j running through the pixels, for each $u \in \{0,1,\ldots,k\}$ (e.g., different image) a modified input image $MM_u$ is obtained by taking the original image pixels and adding a weighted sum of previous errors (e.g., the summation shown in the pseudo-code) to the original image pixels.

Recall that with error diffusion, the modified input is created and then the color that is the closest to (or close to) the modified input, is selected as the output pixel.

Recall also that each extended output color can be split into its k+1 coordinates of colors. Then, the extended output image is generated by picking the extended output color which minimizes the differences in color between each of the modified input and corresponding output coordinates. Thus, for each pixel (location, coordinate, etc.) in the output image, the color differential or error is minimized. The error e (i,j) (differential) at the (i,j)-th pixel is defined as the difference between the modified output image pixel for all the images and the extended output image pixel.

It is noted that the method of the invention loops for all pictures (images) and for all pixels thereof.

Hence, given the algorithm to extract $M'_1, \ldots, M'_k$ as presented earlier, it is clear that this problem can be recast as a halftoning problem. Consider the image X where the (i,j)-th pixel is the vector $(M_0(i,j), M_1(i,j), M_2(i,j), \ldots, M_k(i,j))$. The set of possible output colors is C. That is, in step 110 of the data hiding method 100 according to the present invention, a set C of extended colors are chosen. Each member of this set C is a (k+1)-tuple of d-dimensional vectors.

For a member D of the set C, each of the k+1 d-dimensional vectors of D is termed a coordinate of D. For example, for $D=(c_1, c_2, \ldots, c_{k+1})$ where each $c_1$ is a d-dimensional vector, the first, second, $\ldots$, (k+1)-th coordinates of D are $c_1, c_2, \ldots, c_{k+1}$, respectively.

The set C is chosen such that for each j in the set $\{0,1,\ldots,255\}^d$, there exists at most one member of C such that the first coordinate is j. In other words, the size of C is less than the size of $\{0,1,\ldots,255\}^d$ ($=256^d$) and a projection of C into its first coordinate is a one-to-one mapping.

In a preferred embodiment, additionally it is required that C is of the same size as $\{0,1,\ldots,255\}^d$. This means that for each j in the set $\{0,1,\ldots,255\}^d$, there exists exactly one member of C such that the first coordinate is j and the projection of C into its first coordinate results in $\{0,1,\ldots 255\}^d$.

The corresponding halftoning problem is to generate a halftone image where every pixel is an element of C such that the halftone image looks like X. Then the output of an halftoning algorithm which solves this halftoning problem is used as the extended output image ExOut. Some halftoning algorithms used for this purpose by the invention will be vector error diffusion and local iteration methods.

It is queried as to how one quantifies the requirement that the halftone image "looks" like the original image. One possible way is to model the human visual system as a linear low-pass filter. The image A "looks" like image B if $\|L(A-B)\|$ is small, where L denotes the linear low-pass operator of the human visual system. With this model of the human visual system, in the present invention, the corresponding halftoning problem becomes the following optimization problem: find the output image ExOut including pixels from the set C such that $$\sum_{u=0}^{u=k} v_u \|L(ExOut_u - M_u)\|^p$$

is minimized where $ExOut_u$ denotes the image extracted from $ExOut_u$ by taking the (u+1)-th coordinates of each pixel of ExOut. p is generally chosen to be 2. The weights $v_u$ assign different weights to different images. For example, if the closeness of the embedded source image $M_0'$ to the original source image $M_0$ is important, the weight $v_0$ should be larger than the other weights. It is noted that these weights may be optionally used. Examples of the linear filter L can be found in R. Näsänen, "Visibility of halftone dot textures," IEEE Trans. Syst. Man, Cybernetics, vol.14, no. 6, pp. 920–924, 1984 and J. Sullivan, L. Ray and R. Miller, "Design of minimum visual modulation halftone patterns," IEEE Trans. Syst. Man, Cybernetics, vol. 21, no. 1, pp. 33–38, 1991.

In this first preferred embodiment, vector error diffusion will be used as the halftoning method. In step 140 of the data hiding method 100 according to the present invention, the (i,j)-th pixel of the extended output image ExOut(i,j) is selected as the member of C which is the closest to the (k+1)-tuple $(MM_0(i,j), MM_1(i,j), \ldots MM_k(i,j))$. Thus, the extended color is selected such that all its coordinates are close to the modified inputs $MM_0(i,j), MM_1(i,j), \ldots MM_k(i,j)$. The notion of closeness can be the Euclidean norm or a weighted Euclidean norm, with different weights for the different images $MM_0, \ldots$ (e.g., the distance between a member $(c_0, c_1, \ldots, c_k)$ of C and $(MM_0(i,j), MM_1(i,j), \ldots MM_k(i,j))$ is $$\left(\sum_{u=0}^{u=k} v_u \|MM_u(k,1) - c_u\|^p\right)^{1/p}$$

(generally p is chosen to be 2)).

The difference between ExOut(i,j) and $(MM_0(i,j), MM_1(i,j), \ldots MM_k(i,j))$ is an error vector $e(i,j)=(e_0(i,j), \ldots e_k(i,j))=(MM_0(i,j), MM_1(i,j), \ldots MM_k(i,j))-ExOut(i,j)$ which is computed in step 150.

Thus, in step 130, $MM_u(i,j)$ is found which is the modified input for $M_u$ at location (i,j) and is defined as $$MM_u(i,j) = M_u(ij) + \sum_{x,y} w_u(x,y) e_u(i-x, j-y)$$

where $w_u$ are the error diffusion weights corresponding to $M_u$. B. W. Kolpatzik and C. A. Bouman, "Optimized error diffusion for high quality image display," Journal of Electronic Imaging, vol. 1, no. 3, pp. 277–292, 1992, disclose procedures for the design of error diffusion weights appropriate for the chosen visual human visual system model. These weights are selected in step 120. Then, in step 160 it is determined whether all of the pixels have been processed. If not, the process returns to step 130 to process another pixel.

After ExOut(i,j) is constructed, in step 170, the first element of the (k+1)-tuple ExOut(i,j) will be used to form the (i,j)-th pixel of the embedded source image $M_0'$.

Error diffusion and other halftoning techniques are described in the book "Digital Halftoning" by R. Ulichney, MIT Press, 1987. Vector error diffusion is described in H. Haneishi, T. Suzuki, N. Shimoyama, and Y. Miyaki, "Color digital halftoning taking calorimetric color reproduction into account," Journal of Electronic Imaging 5, pp. 97–106, January 1996.

To extract the auxiliary images $M_1', \ldots, M_k'$, for each pixel $M_0'(i,j)$, find the (k+1)-tuple in C which has $M_0'(i,j)$ as it first element. Then, $M_1'(i,j), \ldots, M_k'(i,j)$ is set to be the second, ..., k+1-th coordinates of the (k+1)-tuple, respectively.

For simplicity, first considered is the case of a grayscale image (i.e., d as defined earlier is equal to 1). It is assumed that each pixel in the image is an integer between 0 and 255.

Furthermore, it is assumed that a single image $M_1$ is desired to be embedded into the source image $M_0$ (i.e., k=1).

Figure 2A:
FIG. 2A shows a source image $M_0$.

Referring now to FIGS. 2A–2D, there is shown a source image $M_0$ (FIG. 2A) and an auxiliary image $M_1$ (FIG. 2B) which is to be embedded into the image of FIG. 2A.

Figure 2B:
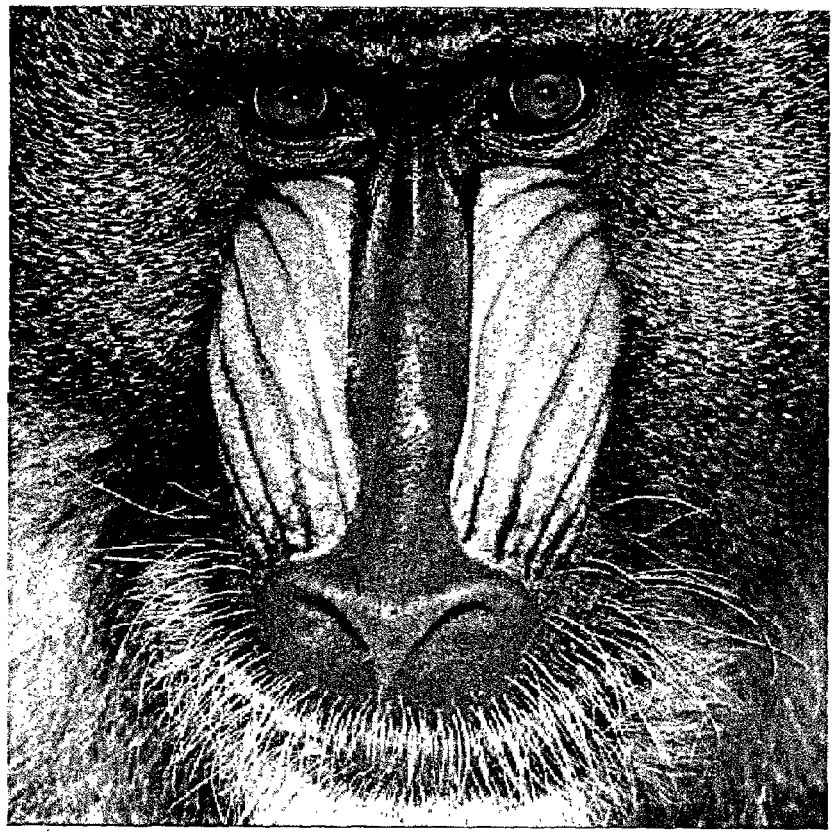
FIG. 2B shows an image $M_1$ to be embedded into $M_0$.
Figure 2C:
FIG. 2C shows the modified source image $M_0'$ after embedding $M_1$ into $M_0$.
Figure 2D:
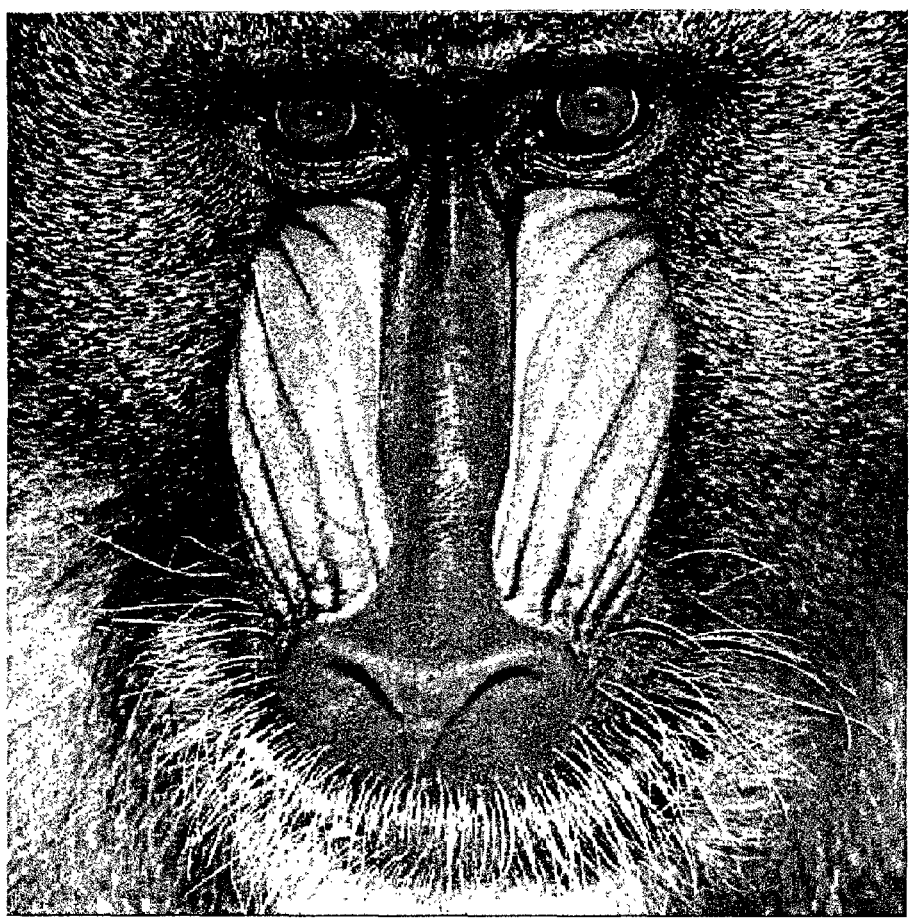
FIG. 2D shows the extracted image $M_1'$ from $M_0'$.

FIG. 2C shows the modified source image $M_0'$ after embedding the image (e.g., the baboon image) of FIG. 2B into the image (e.g., the woman image) of FIG. 2A. FIG. 2D shows the extracted image $M_1'$ in which the baboon image of FIG. 2B has been extracted back out of the image of FIG. 2C.

For vector error diffusion, the convex hull of the output color C should cover as much as possible the space of possible (k+1)-tuples of d-dimensional vectors, or in this preferred embodiment pairs of integers in the range [0,255] as discussed in R. Adler, B. Kitchens, M. Martens, A. Nogueira, C. Tresser, and C. W. Wu, "Error bounds for error diffusion and other mathematical problems arising in digital halftoning," in IS&T/SPIE Conference on Color Imaging: Device-independent Color, Color Hardcopy and Graphic Arts V, Proceedings of SPIE, vol. 3963, pp. 437–443, 2000. Thus, the convex hull of C should cover a large area of the square $[0,255]^2$. One possible choice for C is the set (a,p(a)) where a=0,1, ..., 255, and p is a random permutation of {0,1, ..., 255}. Because of the requirements on C, the set C must be a subset of a set of the form (a,f(a)) for some function f and a is an integer in the range [0,255]. In a preferred embodiment, C is chosen to be the set (a,f(a)) for some function f where a=0,1, ..., 255.

Figure 3A:
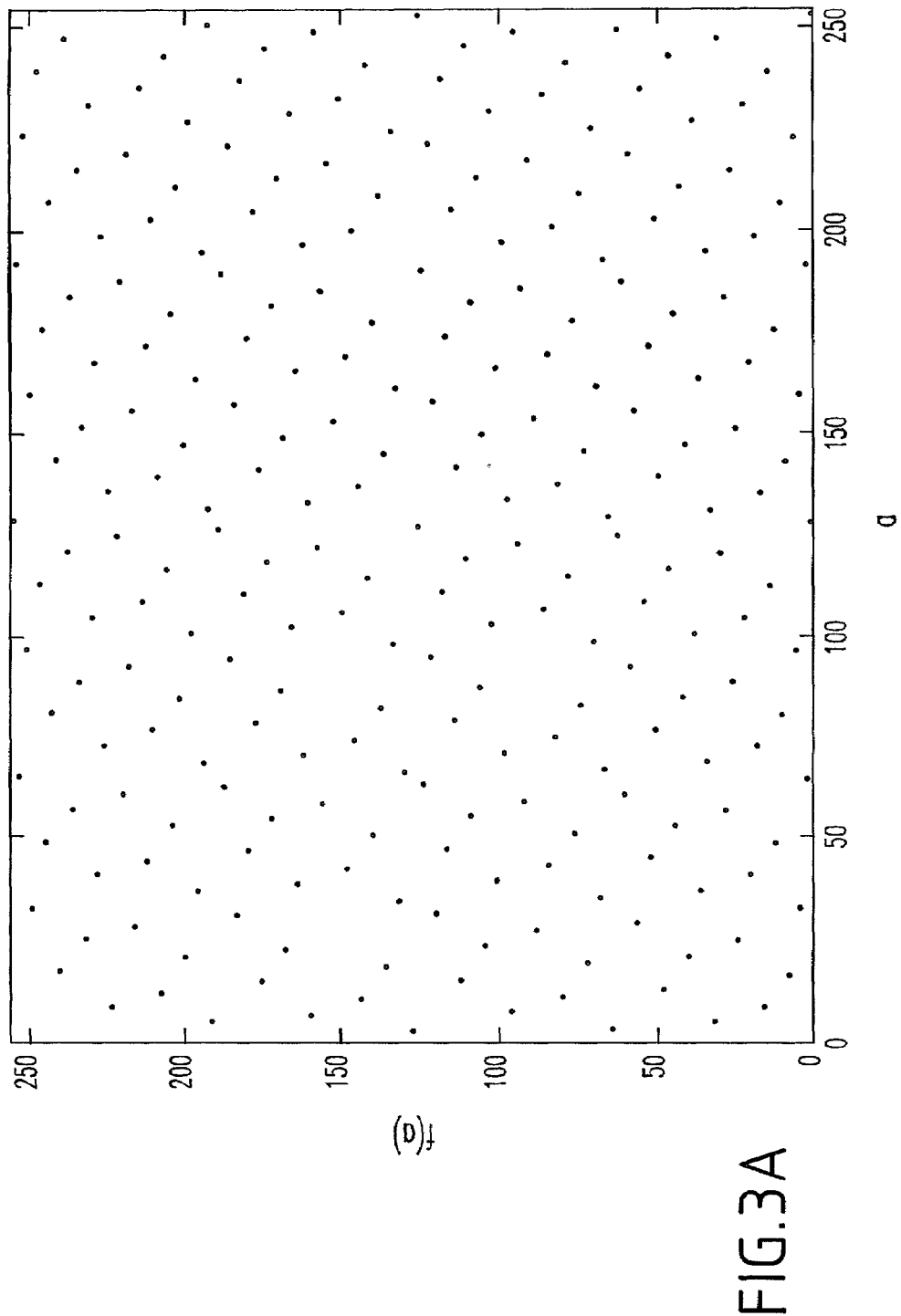
FIG. 3A shows the set $C=\{a,f(a)\}$ where C are points distributed rather evenly and covering $[0,255]^2$.

FIG. 3A shows a plot of such a choice for a set C of possible output colors (e.g., extended output colors). That is, halftoning is desired not on just one image, but on a drawing of a plurality of images (e.g., jointly). Hence, instead of just one pixel, there are a pair of pixels. Indeed, in error diffusion, one starts off with a range of colors, and then the error diffusion technique selects the color which is closest thereto.

However, since the invention deals with several images (e.g., two images), the invention does not merely select a single color (coordinate), but instead selects a plurality of coordinates in a two-dimensional space (representing total color). The dots shown in FIG. 3A represent possible outputs which can be selected based on the inputs.

For example, in FIG. 3, a special property of the set C of the invention is that, given a vertical line projected down (or up), there is at most one (and in a preferred embodiment, exactly one) optimal point (output color) which can be selected. Hence, by knowing where one is on X axis (e.g., representing a pixel for the first image), the Y coordinate (representing a pixel for the second image) can be selected.

Thus, with the invention, a pair of pixels are provided representing the first and second images. If there were more than one image to embed into a source image (e.g., embedding two images into a source image), then a plot in an n-dimensional space would be created (where n is the total number of images). Hence, embedding two images into a source image would result in a plot in a 3-dimensional space (e.g., a cube).

Thus, returning to FIG. 3A, it is seen that the convex hull of C covers quite a large area of $[0,255]^2$. This set C is used to generate FIG. 2C.

Since the projection of C onto the first coordinate is the set $\{0,1, \ldots, 255\}^d$, C can be thought of a function from $\{0,1, \ldots, 255\}^d$ into $\{0,1, \ldots 255\}^{kd}$.

In this preferred embodiment, C is a function f from $\{0,1, \ldots, 255\}$ into the set $\{0,1, \ldots, 255\}^2$.

To cover a large area of $[0,255]^2$, this function f is generally discontinuous and is sharply varying, as shown in FIG. 3A. This implies that small changes in the embedded source image $M_0'$ results in large changes in the extracted image $M_1'$.

Figure 3B:
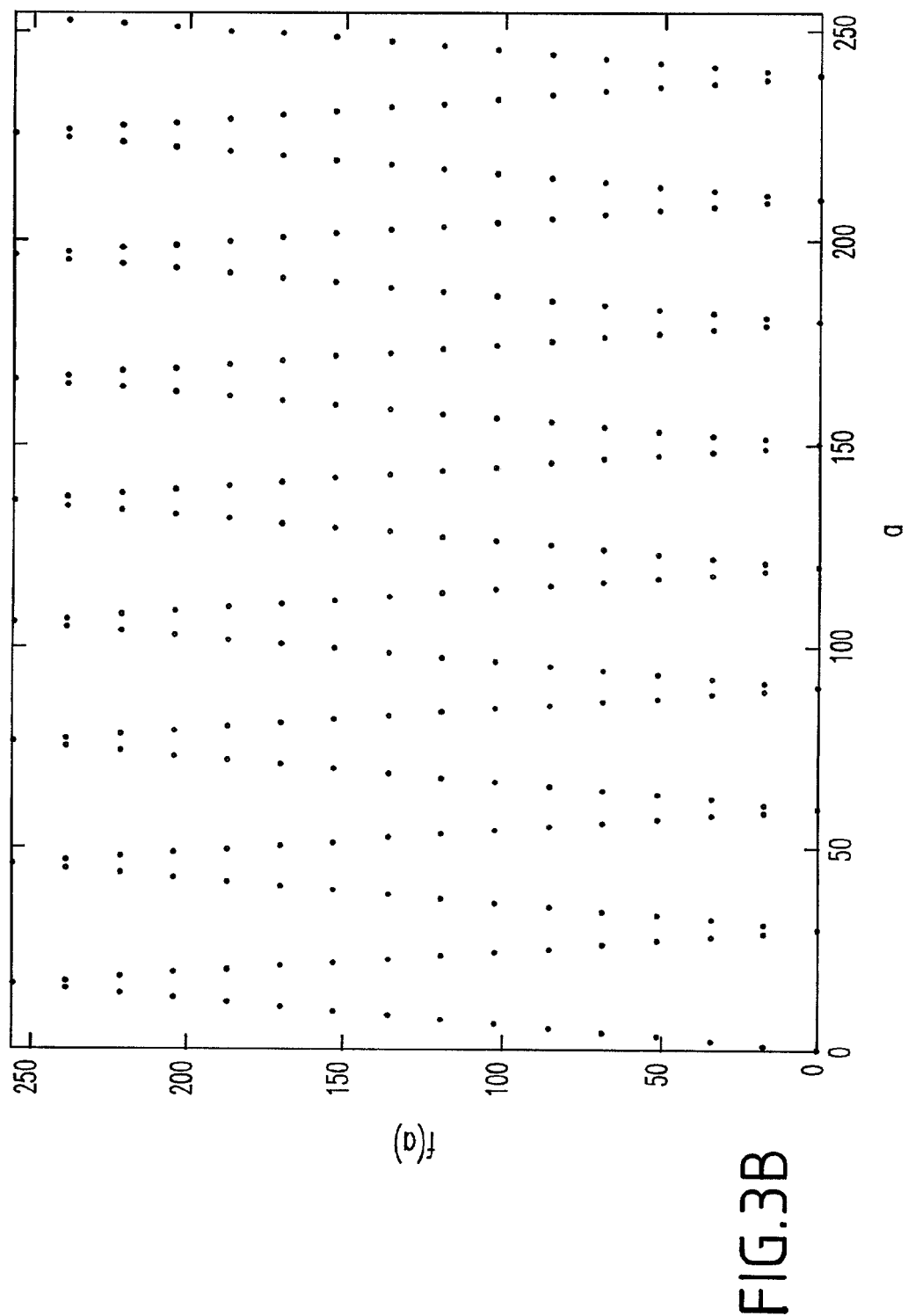
FIG. 3B shows the set $C=\{a,f(a)\}$ where f is a relatively smooth function.

However, by using a smoother function for C, this effect can be reduced resulting in more robustness for the extracted image against changes in the embedded source image, such that changes in the first image do not dramatically affect the second image. Hence, moving a small amount in the X-axis (the first image) does not result in a substantial change in the Y-direction (the second image). An example of such a smoother C is shown in FIG. 3B. However, this usually comes at a cost of the convex hull of C covering a smaller area of $[0,255]^2$ which could mean larger errors in the error diffusion process, and could generate $M_0'$, $M_1'$ that are less faithful to the original images $M_0$, $M_1$ respectively. One way to avoid large errors is to project the input color pairs in $[0,255]^2$ into the convex hull of C as was done in the aforementioned paper by Adler et al and U.S. patent application Ser. No. 09/182,420, entitled "Constrained Digital Halftoning", filed on Oct. 30, 1998.

Figure 4A:
FIG. 4A is a modified image $M_0'$ with $M_1$ embedded using the set C in FIG. 3B.

Thus, the image in FIG. 2A is embedded with the image in FIG. 2B using the smoother set C in FIG. 3B, thereby resulting in the image shown in FIG. 4A.

Next, the modified image $M_0'$ is compressed using Joint Pictures Experts Group (JPEG) lossy compression technique.

Figure 4B:
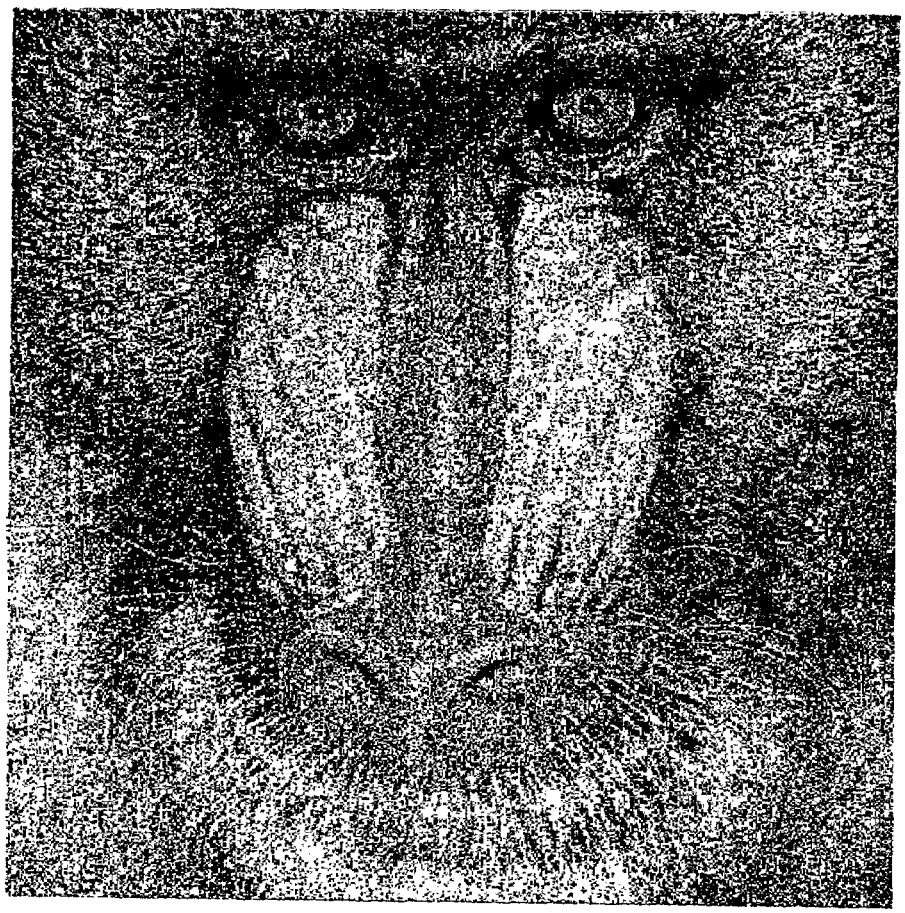
FIG. 4B shows the extracted image $M_1'$ after $M_0'$ is compressed by a Joint Pictures Expert Group (JPEG) compression algorithm.

After decompression, the embedded image $M_1'$ (of the baboon) is extracted and shown in FIG. 4B. As shown, some distortion has occurred due to the JPEG lossy compression, but the embedded image is still easily recognizable as the image of FIG. 2B. As mentioned above, if a smoother function is selected, then the image extracted will appear more similar.

As described above, in the aforementioned conventional approach by K. Knox, a system was proposed to embed an image into another image. However, there are some severe differences between Knox's approach and the above preferred embodiment.

First, as mentioned above, in the approach by Knox, two separate error diffusion algorithms are applied independently to the two images, and therefore the choice of the output colors is less ideal than the present invention where the error diffusion is applied jointly to the two images by considering pairs of pixel values.

Secondly, the extraction algorithm in Knox's approach is based on reversing the bits of the pixels. This corresponds to a set C of the form (a,r(a)) where r(a) is a with the bits reversed. This function r is very discontinuous. However, there is a portion of $[0,255]^2$ which the convex hull of C does not cover. It is noted that the set C in FIG. 3A is a modification of the function r so that the convex hull of C covers more of $[0,255]^2$.

In complete and fundamental contrast, in the present invention, the set C can be chosen that can be any set of the form (a,f(a)) and the function f can be chosen depending on the application.

For instance, f can be smooth for more robustness, or f can be chosen so that the convex hull of C covers a large portion of $[0,255]^2$ and the function f does not have to be one-to-one as is the case in Knox.

In one application, the embedded images can contain ownership information, recipient information, etc.

In other applications, the embedded information can be used to detect, localize and repair changes to the embedded source image, and can be used as part of an authentication system for images. In this application, $M_1$ is a scrambled version of the source image $M_0$. Hereinbelow, the second preferred embodiment of the present invention will be described with an exemplary application of image authentication.

Second Embodiment

Turning now to FIGS. 5A–6E, the second embodiment will be described in detail.

As explained above, error diffusion is used through one pass for each pixel. However, such a technique traverses pixels through a fixed order and cannot be used here. Thus, this aspect of the invention provides a loop in which for each member of set C (e.g., 256 points in a preferred embodiment) it is attempted to set the output pixel at a particular point (i,j) to determine whether the error is minimized by selecting this particular output. If the error is minimized, then the point is selected.

In particular, $M_1$ is generated from $M_0$ by a permutation of the pixels: $M_1(P(i,j))=M_0(i,j)$, where P is a permutation of the pixel locations (i,j). Since such a permutation destroys the spatial relationship between the pixels, in the halftoning algorithm, the inverse permutation is applied to restore the spatial relationship before calculating the error function, i.e., the function to minimize is:

$$v_0 \|L(ExOut_0-M_0)\|^2 + v_1\|L(PExOut_1-M_0)\|^2$$

where $PExOut_1$ is the image defined by:

$$PExOut_1(i,j)=ExOut_1(P(i,j));$$

In a preferred embodiment, the values of $v_0$ and $v_1$ are chosen as $v_0=v_1=1$. Since the spatial relation between the pixels in $ExOut_0$ and $ExOut_1$ are now different, a halftoning algorithm such as error diffusion which relies on a certain order of pixel traversal is not suitable. Instead, the present invention uses a more isotropic halftoning algorithm.

Figure 5B:
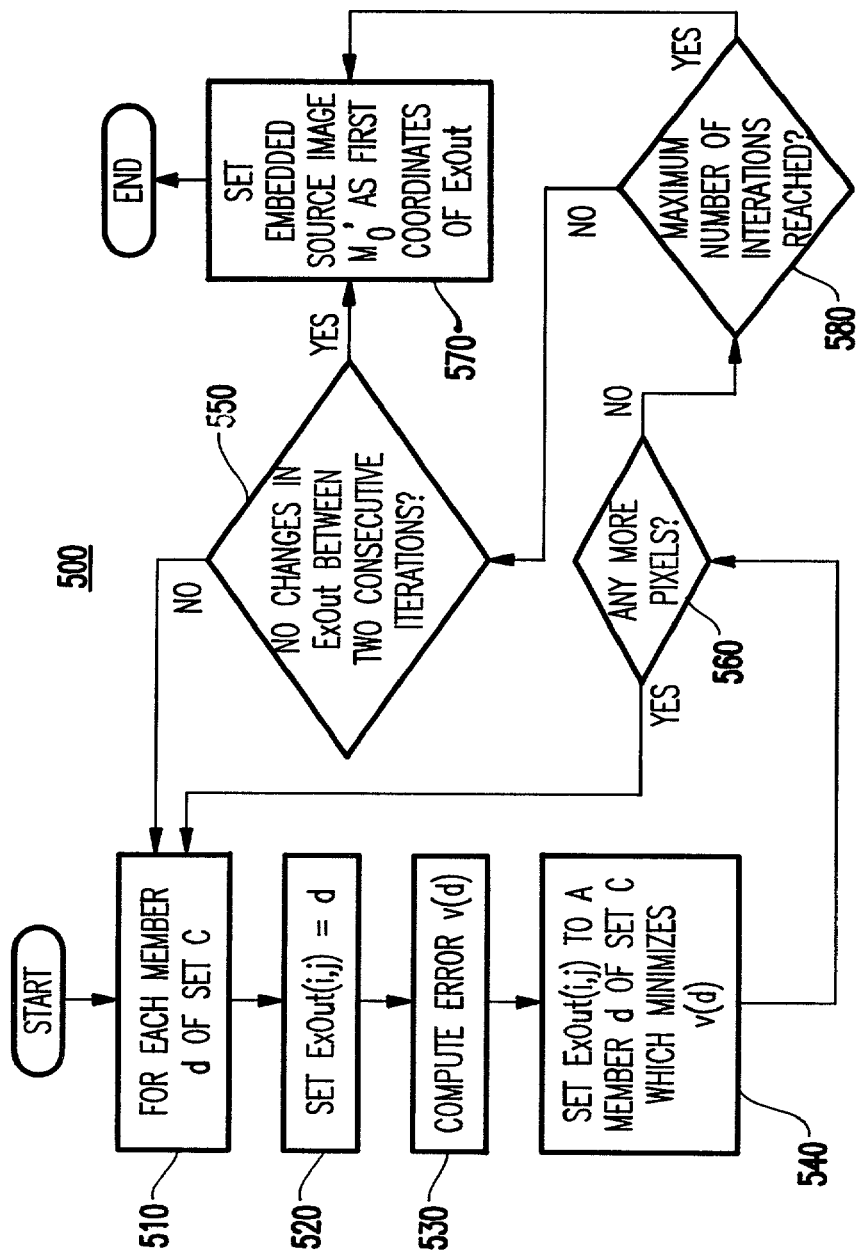
FIG. 5B is a flowchart of a method 500 of the present invention corresponding to the pseudo-code of FIG. 5A.

Referring to the flowchart of FIG. 5B, in step 510 for each pixel and for each member d of set C in step 520 ExOut(i,j) is set equal to d.

Then, in step 530, an error v(d) is computed at the particular pixel (i,j).

In step 540, ExOut(i,j) is set to the member d of set C which minimizes v(d) among all members of C. Then, in step 560, it is determined if there are any pixels in the current iteration which are not processed.

If "YES", then the process loops back to step 510 to select a new pixel to process.

If "NO", then the process checks whether the maximum number of iterations have been reached in step 580. If "YES", the embedded source image $M_0'$ is set as the first coordinates of ExOut in step 570 and the process ends. If "NO", the process checks in step 550 if ExOut has not changed between the last two consecutive iterations. If "NO", the process loops back to step 510 to start a new iteration. If "YES", the embedded source image $M_0'$ is set as the first coordinates of ExOut in step 570 and the process ends.

Thus, in the second embodiment of the present invention, at each iteration the pixels are traversed in a particular order and for each location (i,j), the pixel ExOut(i,j) is chosen from the set C, such that $$v_0\|L(ExOut_0-M_0)\|^2+v_1\|L(PExOut_1-M_0)\|^2$$

is minimized.

This is run through several iterations until a local minimum is reached (i.e., no pixel changes in ExOut between two iterations) or the maximum number of iterations is reached. As mentioned above, the pseudo-code of this method (algorithm) of the present invention and a flow diagram thereof are shown in FIGS. 5A and 5B, respectively. In FIG. 5A, the parameters $v_0$ and $v_1$ are chosen to be 1 and p is chosen to be 2.

Because of the permutation, localized changes to the source image result in changes to the embedded images which are spread out throughout the image. This is similar to the technique used in error correction to combat block errors in, for example, compact disk recordings.

The reconstructed embedded image (after inverse permutation) is compared with the source image to check whether significant changes have occurred. This also can localize where such changes have occurred.

Furthermore, because the changes are spread throughout the embedded image, the changes to the embedded image will not be as disruptive visually as the changes to the source image. This allows the corrupted source image to be repaired by using the embedded image. This is illustrated in FIGS. 6A–6E.

Figure 6A:
FIG. 6A shows the embedded source image $M_0'$ after it has been modified; a portion is erased and some areas are painted over.

In FIG. 6A, the embedded source image $M_0'$ is modified by erasing a portion of the image and painting certain areas of the image (e.g., the corrupted portion). In the case of FIG. 6A, a portion of the image has a black rectangle painted thereon and some other areas have been painted over with text, lines and squiggles. That is, the corrupted portion may be, for example, the portion of the image which has been tampered with (e.g., the black rectangle, the text "Test", some squiggles in the eyebrow and shoulder area among others in FIG. 6A are the areas that has been tampered with) and thus the area that needs to be "repaired."

Figure 6B:
FIG. 6B shows the extracted image $M_1'$ extracted from FIG. 6a after applying the inverse permutation.

Next, the embedded image image $M_1'$ is extracted from this modified $M_0'$, as shown in FIG. 6B. The embedded image is the same as the original but it has been permuted by re-shuffling of the pixels.

That is, after applying the inverse permutation to $M_1'$, the result of which is denoted by $PM_1'$, it is seen that it still resembles $M_0$ quite closely, as shown in FIG. 6B. In fact, the tampered portions of the image have been "repaired". That is, the noise pixels spread throughout the image correspond to the tampered pixels in the source image which have been spread out by the permutation. Hence, the erased portion is removed by shuffling the noise pixels all over the image.

Figure 6C:
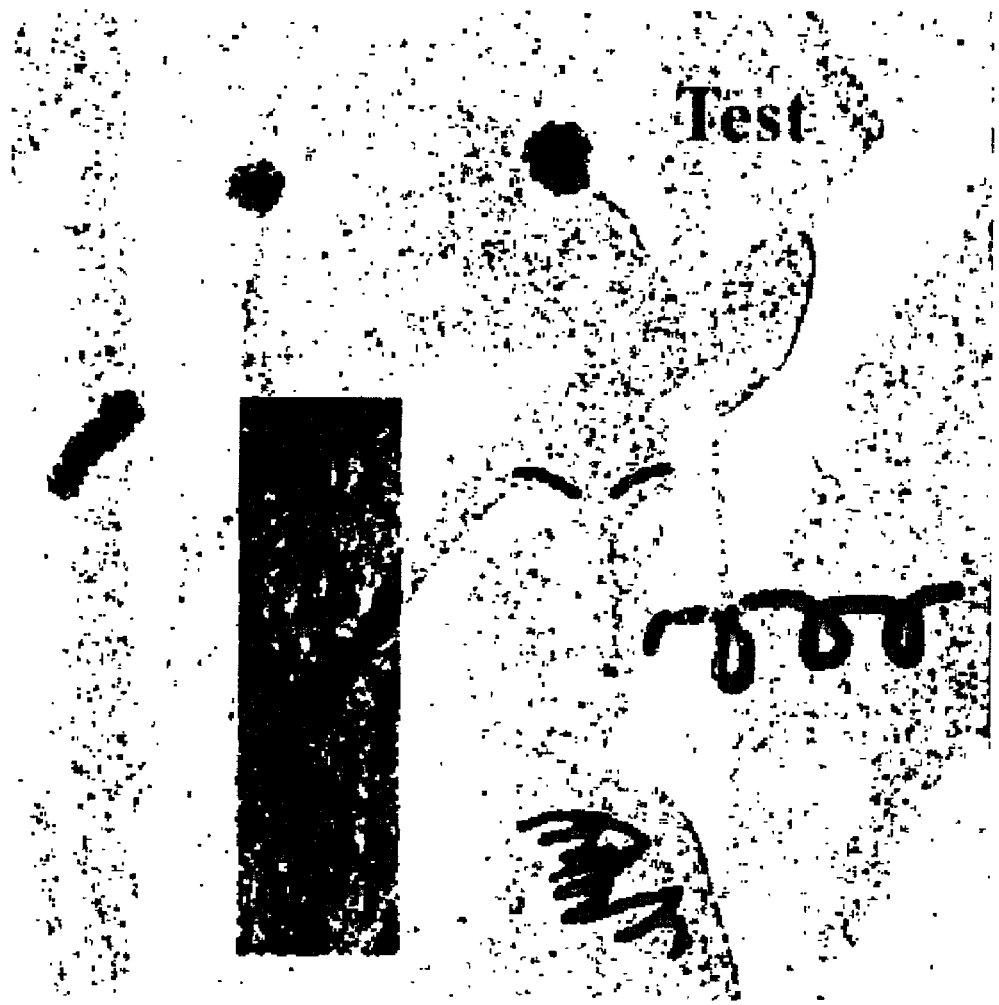
FIG. 6C shows an estimate of where the modification to the embedded source image $M_0'$ occurred in FIG. 6a as indicated by the dark regions.
Figure 6D:
FIG. 6D shows the extracted image $M_1'$ extracted from FIG. 6A after applying the inverse permutation where pixels which were modified are determined by interpolation from unmodified pixels.

By low pass filtering ($M_0'-PM_1'$) where $PM_1'$ is $M_1'$ after inverse permutation (FIG. 6B) and finding the pixels with relatively large norms, an estimate of where the modification occurs can be found, as shown in FIG. 6C, where the dark areas indicate where the modifications to the source image occurred. This estimate can be further refined by morphological operations to remove small clusters of pixels and fill in small holes. Thus, an estimate can be made by comparing the extracted image with the original image, to determine where one sees the modification (e.g., the black rectangle, squiggles, text, etc.). Hence, one can determine where the reconstruction should be performed, and the reconstruction/repair can be limited thereto (e.g., the unmodified or "good" pixels outside the black tampered portion need not be reconstructed). This estimate can be used in two ways to improve reconstruction, as described below.

Figure 6E:
FIG. 6E shows the extracted image in FIG. 6D after applying median filtering to reduce residual impulsive noise.

Thus, this estimate can also be used to determine where the embedded image should be recovered. Using this estimate the location of the noise pixels in FIG. 6B can be estimated by applying the permutation to the black pixels in FIG. 6c. These noise pixels are not recovered in $PM_1$ (FIG. 6B) but are interpolated from the rest of the pixels. Thus, using this algorithm with bilinear interpolation results in the image shown in FIG. 6D. It is seen that the noise in FIG. 6B has been largely removed. The residual noise can be further removed by median filtering. This operation is shown in FIG. 6E using a 3 by 3 median filter.

The second way the estimate is used to aid reconstruction is the following preferred embodiment. In this preferred embodiment, the "repaired" source image is constructed as follows. Using the above estimate, for the pixels which were not modified in the source image, the "repaired" source image pixels are the source image pixels. For the modified pixels, the "repaired" source pixels are recovered from the embedded image using interpolation (as performed in FIG. 6D or FIG. 6E).

To enhance the security of the authentication scheme, the permutation P and the choice of set C can be used as (or generated from) a secret key.

For color images, the size of C can be as large as $256^3$. However, ones of ordinary skill in the art taking the present application as a whole, may deem that this is too large to implement the halftoning algorithm efficiently. In this case, the color image may be split into the respectively different color planes (e.g., red, green blue in RGB space), and each color plane is processed independently. In other words, a RGB image is considered as three (3) grayscale images which are processed independently with possibly different permutations P and sets C for each of the three grayscale images.

Although the coordinates of elements of the set C in the preferred embodiment are values of single pixels, it is clear the present invention can easily be adapted to work by anyone skilled in the art when the coordinates are values of blocks of pixels.

It is noted that by considering video as a stream of images, the present invention can be used to hide data in and/or authenticate video data as well. Furthermore, by considering video as a three dimensional data set with time as another dimension, spatiotemporal halftoning can be used to embed data in (and/or authenticate) video data.

It is noted that the smaller the portion which has been modified (e.g., tampered with), the more faithful the reconstruction will be, and likewise the larger the portion of the original image used to "repair" the modified portion the better the resolution and fidelity of the reconstruction.

While the overall methodology of the invention is described above, the invention can be embodied in any number of different types of systems and executed in any number of different ways, as would be known by one ordinarily skilled in the art.

For example, as illustrated in FIG. 7, a typical hardware configuration of an information handling/computer system for use with the invention. In accordance with the invention, preferably the system has at least one processor or central processing unit (CPU) 711 and more preferably several CPUs 711. The CPUs 711 are interconnected via a system bus 712 to a random access memory (RAM) 714, read-only memory (ROM) 716, input/output (I/O) adapter 718 (for connecting peripheral devices such as disk units 721 and tape drives 740 to the bus 712), user interface adapter 722 (for connecting a keyboard 724, an input device such as a mouse, trackball, joystick, touch screen, etc. 726, speaker 728, microphone 732, and/or other user interface device to the bus 712), communication adapter 734 (for connecting the information handling system to a data processing network such as an intranet, the Internet (World-Wide-Web) etc.), and display adapter 736 (for connecting the bus 712 to a display device 738). The display device could be a cathode ray tube (CRT), liquid crystal display (LCD), etc., as well as a hard-copy printer (e.g., such as a digital printer).

In addition to the hardware/software environment described above, a different aspect of the invention includes a computer-implemented method for data hiding and authentication via halftoning and coordinate projection. This method may be implemented in the particular environment discussed above.

Such a method may be implemented, for example, by operating the CPU 711 (FIG. 7), to execute a sequence of machine-readable instructions. These instructions may reside in various types of signal-bearing media.

Thus, this aspect of the present invention is directed to a programmed product, comprising signal-bearing media tangibly embodying a program of machine-readable instructions executable by a digital data processor incorporating the CPU 711 and hardware above, to perform the above method.

This signal-bearing media may include, for example, a RAM (not shown in FIG. 7) contained within the CPU 711 or auxiliary thereto as in RAM 714, as represented by a fast-access storage for example. Alternatively, the instructions may be contained in another signal-bearing media, such as a magnetic data storage diskette 800 (e.g., as shown in FIG. 8), directly or indirectly accessible by the CPU 711.

Whether contained in the diskette 800, the computer/CPU 711, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code, compiled from a language such as "C", etc.

Thus, with the unique and unobvious aspects of the present invention, a method (and system) are provided which can perform data hiding via halftoning and coordinate projection. Further, the invention can also be used in a multimedia authentication scheme.

The data hiding scheme of the invention embeds auxiliary data into an image imperceptibly. As halftoning algorithms throw away and distorts data while preserving image appearance, the invention embeds data into an image, but uses halftoning to ensure that the result still looks similar to the original image.

While the invention has been described in terms of several preferred embodiments, those skilled in the art will recognize that the invention can be practiced with modification within the spirit and scope of the appended claims.

What is claimed is:

1. A method of embedding data into an image, comprising:
   producing an extended image using a halftoning algorithm on a collection of images; and
   projecting said extended image onto its first coordinates.

2. The method of claim 1, wherein auxiliary data is embedded into said image imperceptibly, such that data is embedded into said image, and uses halftoning to ensure that a resultant image looks substantially similar to the original image.

3. The method of claim 1, wherein a space of said extended image comprises a Cartesian product of several image spaces.

4. The method of claim 1, wherein said image is represented as matrices of vectors, such that said image M is represented by a n by m matrix $M(i,j)$ of d-dimensional vectors, each pixel $M(i,j)$ of said image is a d-dimensional vector, where d denotes a dimension of a color space.

5. The method of claim 4, wherein each d-dimensional vector is in the set $\{0,1,\ldots,255\}^d$.

6. The method of claim 1, wherein said image comprises a source image $M_0$, said method further comprising embedding auxiliary images $M_1, \ldots M_k$, into $M_0$ imperceptibly.

7. The method of claim 6, wherein said embedding comprises:
   selecting a set C of extended colors, wherein each member of the set C is a (k+1)-tuple of d-dimensional vectors, and wherein for a member D of the set C, each of the k+1 d-dimensional vectors of D is termed a "coordinate" of D where for $D=(c_1, c_2, \ldots, c_{k+1})$ where each $c_1$ is a d-dimensional vector, the first, second, ..., (k+1)-th coordinates of D are $c_1, c_2, \ldots, c_{k+1}$, respectively.

8. The method of claim 7, wherein the set C is chosen such that for each j in the set $\{0,1,\ldots,255\}^d$, there exists at most one member of C such that the first coordinate is j.

9. The method of claim 8, wherein the set C is of the same size as $\{0,1,\ldots,255\}^d$, such that for each j in the set $\{0,1,\ldots,255\}^d$, there exists exactly one member of C such that the first coordinate is j and the projection of C into its first coordinate results in a bijection.

10. The method of claim 9, further comprising:
    for each pixel location (i,j), selecting said extended output image ExOut as a matrix of elements of C; and
    generating an embedded source image $M_0'$ by taking a first coordinate of the entries of ExOut.

11. The method of claim 10, further comprising:
    extracting the embedded images from $M_0'$.

12. The method of claim 11, wherein said extracting comprises:
    for each of the pixels $M'(i,j)$ of $M_0'$, finding the element $c(i,j)$ in the set C such that $M'(i,j)$ is the first coordinate; and
    generating reconstructed embedded images $M_1', M_2', \ldots M_k'$ by setting $M_u'(i,j)$ equal to the (u+1)-th coordinate of $c(i,j)$ $u=1, \ldots, k$,
    wherein the embedded images $M_0', M_1', M_2', \ldots M_k'$ form the coordinates of the extended output image ExOut.

13. The method of claim 12, further comprising:
    ensuring that the images $M_0', M_1', M_2', \ldots M_k'$ resemble $M_0, M_1, M_2, \ldots M_k$.

14. The method of claim 13, wherein an entire image is selectively embedded into the source image, and the embedded image is used for identifying a tampering of said source image.

15. The method of claim 13, wherein an entire image is selectively embedded into the source image, and the embedded image is used for localizing a tampering of said source image.

16. The method of claim 13, wherein an entire image is selectively embedded into the source image, and the embedded image is used for reversing tampering of said source image.

17. The method of claim 13, wherein an entire image is selectively embedded into the source image, and the embedded image is used for authentication of said source image.

18. The method of claim 1, wherein separate error diffusion algorithms are applied jointly to the embedded images and the source image, such that a choice of output colors is optimized.

19. The method of claim 7, wherein the set C is selectively chosen to be any set of the form (a,f(a)) such that the function f is chosen depending on an application of said method.

20. A method of authenticating an image, comprising:
    producing an extended image using a halftoning algorithm on a collection of images;
    projecting said extended image onto its first coordinates; and
    authenticating said source image by extracting an embedded image from said projection to compare said embedded image to said source image.

21. The method of claim 20, wherein, for each member of a set of extended colors C, an output pixel is set to said member at a particular location (i,j) of the extended image to determine whether error is minimized by selecting such a particular output.

22. The method of claim 21, wherein an auxiliary image $M_1$ is generated from the source image $M_0$ by a permutation of the pixels $M_1(P(i,j))=M_0(i,j)$, where P is a permutation of the pixel locations (i,j).

23. The method of claim 22, wherein, in the halftoning algorithm, an inverse permutation is applied to restore a spatial relationship before calculating the error function such that a function to minimize is:

$$v_0\|L(ExOut_0-M_0)\|^2+v_1\|L(PExOut_1-M_0)\|^2$$

where $PExOut_1$ is the image defined by:

$$PExOut_1(i,j)=ExOut_1(P(i,j)).$$

24. The method of claim 23, where the parameters $v_0$ and $v_1$ are set equal to 1.

25. The method of claim 23, further comprising:
    for each pixel, and for each member d of an extended color set C;
    computing an error v(d) at a particular pixel (i,j) by setting the (i,j)-th pixel of the extended output ExOut equal to d;
    determining the member d of an extended color set C which minimizes v(d);
    setting the (i,j)-th pixel of the extended output ExOut equal to said minimizing d;

repeating the above process if the maximum number of iterations is not reached and the extended output ExOut has changed between the last two consecutive iterations; and otherwise terminating said process.

26. The method of claim 25, wherein, at each iteration, the pixels are traversed in a particular order and for each location (i,j), the pixel ExOut (i,j) is chosen from the set C, such that $$v_0\|L(ExOut_0-M_0)\|^2+v_1\|L(PExOut_1-M_0)\|^2$$

is minimized, wherein a plurality of iterations are made until a local minimum is reached or the maximum number of iterations is reached.

27. The method of claim 26, wherein localized changes to the source image result in changes to the embedded images which are spread throughout the image.

28. The method of claim 26, wherein a reconstructed embedded image is compared with the source image to check whether significant changes have occurred.

29. The method of claim 26, wherein a reconstructed embedded image is compared with the source image to localize where such changes or corruptions have occurred.

30. The method of claim 20, further comprising:
repairing the source image which has been changed by using the embedded image.

31. The method of claim 30, wherein said repairing comprises:
setting the embedded image $M_1$ to be the same as the original source image but after having been permuted by re-shuffling of the pixels thereof;
extracting the embedded image image $M_1'$ from the modified $M_0'$; and
applying an inverse permutation to $M_1'$ to obtain a reconstructed image.

32. The method of claim 31, further comprising:
low pass filtering a difference between the image $M_0'$ and the image $M_1'$ after the inverse permutation, and finding the pixels with predetermined large norms, such that an estimate of where the modification occurs is produced, wherein the estimate is used to determine where the embedded image should be repaired such that if a pixel is modified in the source image, then said pixel after permutation is not recovered in the embedded image $PM_1'$, but is interpolated from other pixels which are determined not to have been modified.

33. The method of claim 32, further comprising:
processing said estimate with a morphological image processing operation.

34. The method of claim 20, further comprising:
detecting whether the image has been tampered with.

35. The method of claim 34, further comprising:
repairing portions of the image which have been detected as being tampered with.

36. The method of claim 20, wherein said image has a hologram property such that for an image having modified and unmodified portions of an original of the image, an unmodified portion of an original of the image is used to reconstruct the image.

37. The method of claim 20, further comprising:
in an image having a portion with one of modified and defective pixels, taking a portion of said image which has not been modified and reconstructing the entire image.

38. The method of claim 34, further comprising:
self-repairing said image with a portion of an original of said image.

39. The method of claim 20, further comprising:
localizing any tampering of said image; and
detecting said tampering.

40. A signal-bearing medium tangibly embodying a program of machine-readable instructions executable by a digital processing apparatus to perform a method for embedding data into an image, said method comprising:
producing an extended image using a halftoning algorithm on a collection of images; and
projecting said extended image onto its first coordinates.

* * * * *